United States Patent [19]

Reid-Green et al.

[11] 4,423,481
[45] Dec. 27, 1983

[54] NUMERICALLY CONTROLLED METHOD OF MACHINING CAMS AND OTHER PARTS

[75] Inventors: Keith S. Reid-Green; William Z. Marder, both of Pennington, N.J.

[73] Assignee: RCA Corporation, New York, N.Y.

[21] Appl. No.: 266,985

[22] Filed: May 26, 1981

[51] Int. Cl.³ .......................... G06F 15/46; G05B 19/41
[52] U.S. Cl. ..................................... 364/474; 318/573; 364/167; 364/475
[58] Field of Search ............... 364/474, 475, 167–171; 318/570, 573, 574

[56] References Cited

U.S. PATENT DOCUMENTS

| | | | |
|---|---|---|---|
| 3,328,655 | 6/1967 | Tripp | 318/573 X |
| 3,461,365 | 8/1969 | Newland et al. | 318/573 |
| 3,548,173 | 12/1970 | Pascoe et al. | 364/168 X |
| 3,619,581 | 11/1971 | Kimura et al. | 318/573 X |
| 3,634,667 | 1/1972 | Okamoto et al. | 318/573 X |
| 3,703,327 | 11/1972 | Pomella et al. | 318/573 X |
| 3,720,814 | 3/1973 | Klein | 318/573 X |
| 3,749,995 | 7/1973 | Leenhouts | 318/570 |
| 3,766,369 | 10/1973 | Watanabe et al. | 318/573 |
| 3,806,713 | 4/1974 | Ryberg | 318/573 X |
| 3,809,868 | 5/1974 | Villalobos et al. | 364/168 X |
| 3,875,382 | 4/1975 | Cutler | 318/573 X |
| 3,887,796 | 6/1975 | Trousdale et al. | 318/696 X |
| 4,031,369 | 6/1977 | Heaman et al. | 318/573 |
| 4,031,445 | 6/1977 | Schmermund | 318/573 X |
| 4,135,238 | 1/1979 | Hamill et al. | 364/474 X |
| 4,135,239 | 1/1979 | Hamill et al. | 364/474 X |
| 4,152,765 | 5/1979 | Weber | 364/474 |
| 4,163,184 | 7/1979 | Leenhouts | 318/573 X |
| 4,199,814 | 4/1980 | Rapp et al. | 364/474 |

Primary Examiner—Joseph F. Ruggiero
Attorney, Agent, or Firm—J. S. Tripoli; D. W. Phillion

[57] ABSTRACT

Milling machine apparatus and method for controlling the relative movement between a working surface and a cutting edge in which said relative movement approximates a mathematically definable path and occurs in a series of line segments each intersecting said path at first and second points with the second point of each line segment being the first point of the next successive line segment. The system comprises first means for determining a maximum distance d' between each successive line segment and said path measured along a line extending from a predetermined reference and passing between said first and second points, where $d' = d + \Delta d$, a predetermined range of value. Also provided are second means responsive to the determination of d' for each successive line segment to then establish the first point of intersection of the next successive line segment, and control means responsive to the determined points of intersection to generate prime moving control signals. Prime moving means respond to said control signals to cause the cutting edge to cut along the successive line segments with respect to said working surface.

6 Claims, 6 Drawing Figures

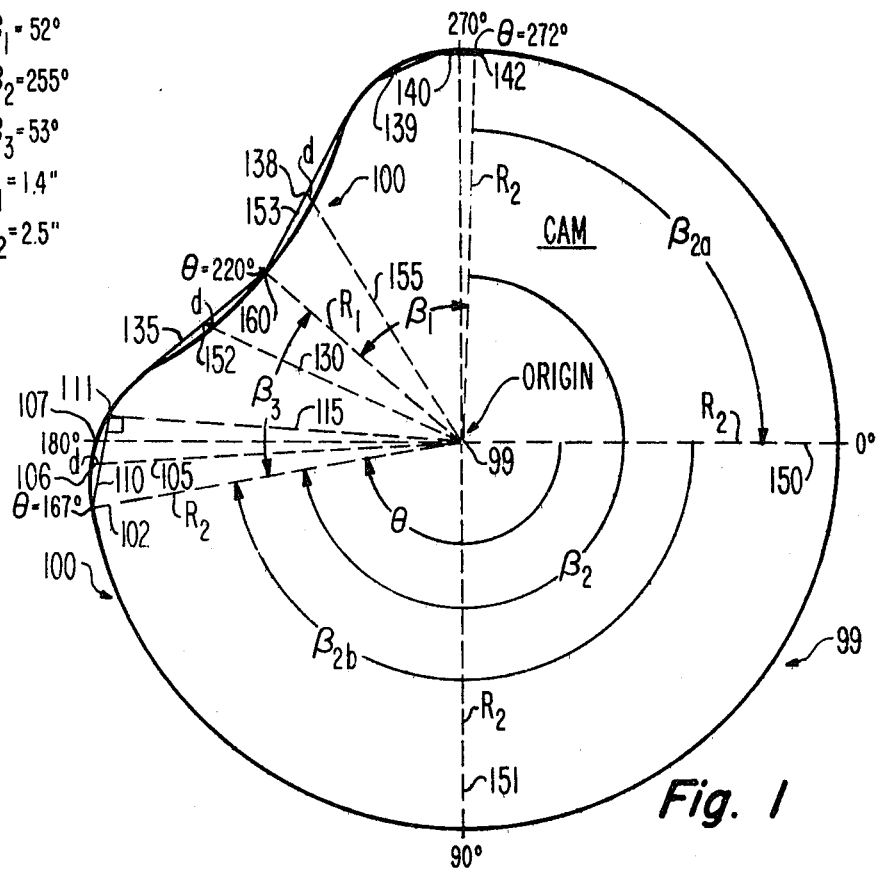
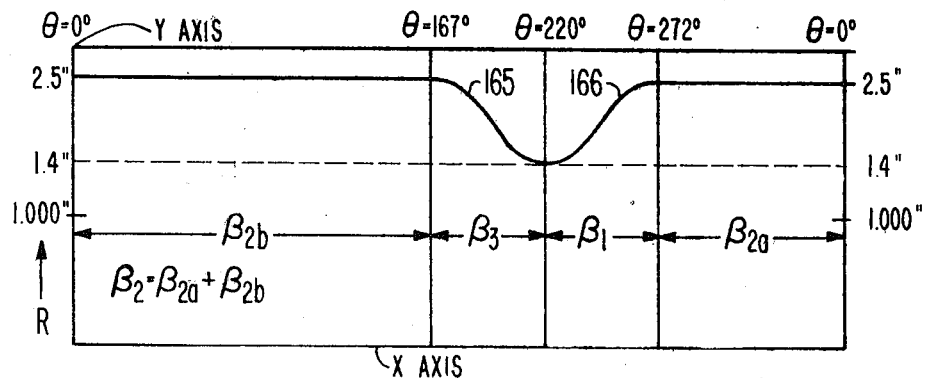

NUMERICALLY CONTROLLED METHOD OF MACHINING CAMS AND OTHER PARTS

This invention relates generally to numerically controlled milling machines and more particularly to a numerically controlled milling maching system for milling profiles such as cams definable by mathematical expressions with a minimum number of cuts and with increased precision.

Because of their versatility and reliability in generating complex motions, cams are among the most useful of profiled mechanical components and will be employed herein as a vehicle for the detailed description of the invention even though the invention with respect to cams is applicable to many trigonometric surfaces other than cycloidal ones. The manufacture of precise cams in low volumes has been costly because of the difficulty in translating the engineer's concept into mechanical specifications which will easily enable a machinist to mill the cam. This problem has often deterred the designer from using cams in favor of such components as gears, cranks, and escapements. The perimetric surface of cams is usually defined by one or more trigonometric curves such as a cycloidal curve, which can be expressed precisely in mathematical terms. The cam surface of cams occurs frequently only over a portion of the cam with the remaining perimetric surface, which is frequently a portion of a circle being known in the art as a "dwell" portion. In the prior art, the radii defining the trigonometric profile are computed at periodic angular increments of such cycloidal portion with the magnitude of said periodic angular increments being determined by the rate of change of radius of the cam surface as well as the precision desired in the final product. Typically, the radius is computed for each one degree angular increment of the cam. The machinist then measures each of the radii forming the cam perimeter, point by point, and then scribes the perimeter on the stock metal. Next, the machinist drills a series of overlapping holes centered at the end of each radius and thereby defining the perimeter of the cam surface (before finishing). The cam is then separated from the stock metal. It is next hand filed to the desired cam surface.

A more recent development is shown in U.S. Pat. No. 3,806,713 issued to Ryberg and entitled, "Method and Apparatus for Maximizing the Length of Straight Line Segments Approximating a Curve." In the '713 Patent, the arc defined by the cycloidal cam surface is divided into equal angular increments having a value such that "straight" lines joining the points of intersection of adjacent radii define said equal angular segments with the cycloidal curve. The maximum deviation of any such straight line from the cycloidal curve is not greater than the error tolerance of the milling machine. Such angular segments are computed in a data processor to meet the conditions of maximum deviation as set forth above. With the foregoing method of the '713 Patent, it is apparent that while the greatest deviation of a straight line segment from the cycloidal curve will exist with respect to at least one straight line segment, the deviations of the remaining straight line sections from the cycloidal curve will be less than that of the error tolerance of the milling machine. Thus, many more straight line cuts are required by the method and apparatus of the '713 Patent than would be required if each of the straight line cuts deviated from the portion of the cycloidal curve that was being intersected by a constant deviation. Further, the "straight" line sections of the '713 Patent are not, in fact, straight line segments, but, in fact, are curved segments since the computations of such line segments is done in polar coordinates as described in detail in the '713 Patent.

The present invention provides a minimum number of straight line cuts with a maximum amount of precision since each straight line cut deviates from the portion of the trigonometric curve which it intersects by a radial distance which is equal to or determined by the maximum error tolerance of the milling machine. Before discussing the drawings in detail, some of the basic concepts of the invention will first be generally discussed.

In accordance with one preferred form of the invention there is provided, in a system having prime moving means for controlling the relative position of a working surface and a cutting edge so that the cutting edge approximates a path with respect to said working surface definable by a mathematical expression, a method of moving said cutting edge relating to said working surface in a series of successive straight line segments each of which lies between a pair of first and second points on said definable path with the second point of each pair being the first point of the next pair and comprising the steps of determining the coordinates for said first and second points for each successive straight line segment with each line segment being maximum distance $d \pm \Delta d$ from said definable path measured along a line extending from a common reference and between said pair of first and second points, generating prime moving means control signals in response to and in accordance with the said determined coordinates, and energizing said prime moving means in accordance with said control signals to move said cutting edge with respect to said working surface successively along the said straight line segments.

In the drawings:

FIG. 1 shows a cam with its various parameters and their general relationship to the determination of the starting and terminating points of the straight line cutting segments;

FIG. 2 shows angular displacement versus radius cam of FIG. 1 in X-Y coordinates as opposed to the polar coordinates of FIG. 1;

Figure 3:
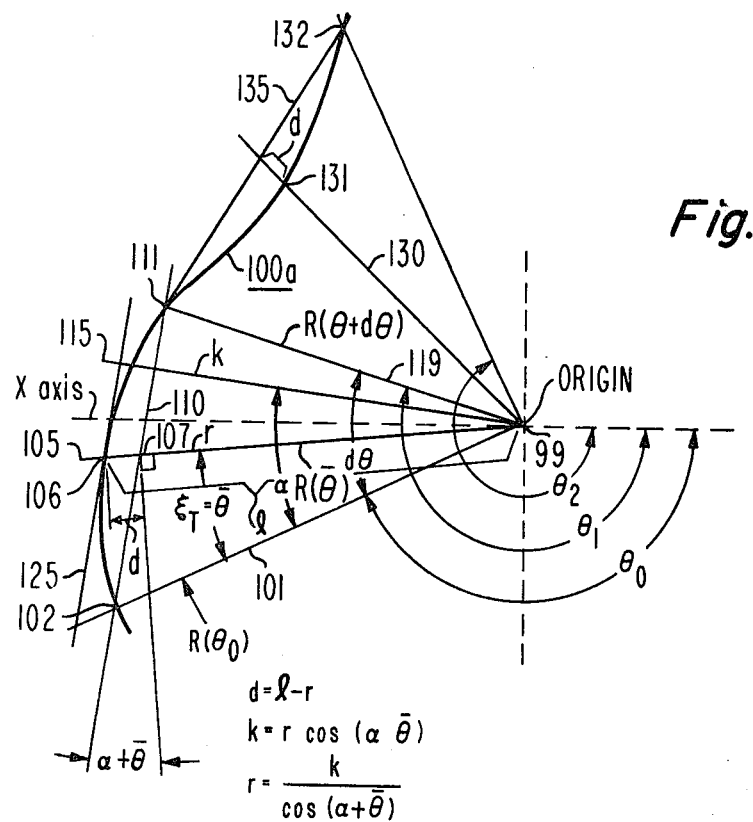
FIG. 3 is an enlargement of a portion of FIG. 1 showing in general the steps required (as explained in the text) to determine the starting and terminating points of a straight line cutting segment.

As stated above, the edge of the cam is definable by a mathematical expression. Such mathematical expressions usually can be expressed in trigonometric terms. More specifically, the general case can be defined by four trigonometric expressions. Special cases such as cycloidal paths can be expressed by adaptations of the four general case expressions.

Later in the specification, the four general expressions will be set forth along with the four expressions adapted to cycloidal paths with the various terms thereof being defined and explained, if necessary.

While as stated above the invention can be employed to form almost any surface having a definable trigonometric path the specification will be directed to a specific cam surface as a vehicle for describing the invention. Specifically, the case of a cam having a cycloidal cam section will be discussed in detail. The adaptation of the invention to other trigonometric paths such as linkages will be apparent to one skilled in the art.

A cam might have the general shape of the cam of FIG. 1 whose perimeter is identified by reference character 100. The trigonometric section lies between the points 102 and 142 of the cam perimeter, i.e., between the angular points 167° and 272° measured in a clockwise direction. The remainder of the cam perimeter, which is the dwell portion thereof is circular in nature. In the present invention, trigonometric sections are shaped by connected small straight line segments, such as segments 110, 135, 138, 139 and 140, as shown in FIG. 1. Each of these straight line segments has a theoretical maximum spacing d from the cam perimeter 100 measured along a line extending through the origin 99 of the cam. Thus, the straight line segment 110 (assuming no machine error) has a maximum distance d as represented by reference character 106, from the cam surface 100 of the cam 199 measured along a radial line 105 which extends through the origin 99 of the cam. In a similar manner, the straight line cuts 135 and 138 each have a maximum theoretical distance d, as indicated by reference characters 152 and 153, from the cam perimeter 100 measured along the radial lines 130 and 155, respectively.

The distance d is a constant for all straight line cutting segments and is based upon the maximum error of the milling cutting edge and the maximum permissible error in the finished product, e.g., the cam. Thus, if the maximum cutting error of the milling machine is also equal to d then the actual path of any straight line segment can vary from a maximum distance $d' = 2d$ from the desired cam perimeter to a precise correlation with the cam perimeter, depending on the amount of machine-induced error present at any given point on a straight cutting segment. It is evident that if the maximum permissible deviation from the desired cam perimeter is not greater than d, then the resultant product will be within permissible tolerances.

The first straight line cut has as its starting point the beginning of the cycloidal portion of the perimeter of the cam.

By means of an educated guess, a radius is drawn from the origin through the trigonometric curve an initial angular distance $\epsilon_1$ from a first radius drawn from the origin through the starting point of the cycloidal curve. The initial angular distance $\epsilon_1$ is selected so that the distance between the intersection of the second first radius with the cycloidal curve and a straight line segment parallel with the tangent to said second point on said cycloidal curve and also passing through said starting point is spaced from said tangent a distance $d'$ approximating the value d. However, since the first selection of the angle $\epsilon_1$ is an estimate expected only to produce an approximation of the value d, it will not ordinarily result in a calculated value of $d'$ which is sufficiently close to the desired value d to be acceptable. It will be assumed herein that to be acceptable the calculated value $d'$ must equal $d \pm \Delta d$.

Thus, the initial value $\epsilon$, will usually have to be altered by a second angular amount $\epsilon_2$, which can be either added to or subtracted from $\epsilon_1$ to produce a resultant total angular value $\epsilon_T$. Subsequent values of increasingly smaller values of $\epsilon_i$ are added (or subtracted) from the previous total value $\epsilon_T$ in accordance with the expression:

$$\epsilon_T = \sum_{n-1} \epsilon_n = \epsilon_1 + \epsilon_2 \ldots + \epsilon_i \ldots + \epsilon_n$$

until the value of $d'$ is within the predetermined acceptable limits.

It is to be noted that, since the mathematical expression for a cycloidal curve is known and the angle of the first and second radii are known with respect to a reference such as a polar coordinate system, that the slope of the tangent can be easily determined and, therefore, also the slope of the straight line cutting segment, which is parallel to said tangent. It is also apparent that since the mathematical expressions for the cycloidal curve and the radii are known, that the coordinates of the intersections of said second radius with both the tangent and the straight line cutting segment are known. Therefore, the distance between the tangent and the straight line cutting segment along the line of the second radius can be determined by calculating the distance between the two points of intersection.

If the value of $d'$ is greater than the desired value $d \pm \Delta d$, then the original value $\epsilon = \epsilon_1$ of the variable angle $\epsilon$ is halved, i.e., decreased by $-\epsilon_1/2 = \epsilon_2$ so that $\epsilon = \epsilon_1 + \epsilon_2$ and the computations made again, based on the intersection of the radius defined by the angle with the cycloidal curve. The resulting calculated value $d'$ is again compared with the desired value $d \pm \Delta d$ and if it is less than the such desired value, then the value of $\epsilon_i$ is increased by one-fourth of its original value $\epsilon_1$ so that $\epsilon = \epsilon_1 + \epsilon_2 + \epsilon_1/4$ and the computation process repeated. Such reduction or increase of the value of $\epsilon_i$ by one-half its previous change and in the direction dependent upon whether the computed value of $d'$ is greater or less than the desired value continues until the computed value of $d'$ is within a predetermined deviation $\Delta d$ from d.

The intersection of the straight line segment, computed as set forth above, with the cycloidal curve at the terminating end of the straight line segment is next computed in terms of the X-Y coordinates and forms the starting point for the next subsequent straight line segment.

It is apparent that the number of straight line segments each spaced a predetermined maximum distance d from the cycloidal curve which they intersect will normally result in the last straight line segment being a distance from the intersected curve a value other than d since the terminating point of the last straight line segment is fixed by the length of the cycloidal portion of the cam.

Accordingly, the total of each angular increment defined by the successive straight line segments and the two radii joining the end points to the origin must be kept so that the last straight line segment can be determined in that it is terminated at the end of the cycloidal portion of the cam.

As states above, the cam of FIG. 1 is shown in polar coordinates with the horizontal dotted line 150 and the vertical dash line 151 dividing the polar coordinate system into 90° segments. The angular values are represented as being measured in a clockwise direction from the 0° end of the dotted coordinate 150. It can be seen in FIG. 1 that the cycloidal portion of the cam begins at $\theta = 167°$ and extends clockwise through $\theta = 272°$. That portion of the cam extending clockwise from $\theta = 272°$ to 167° is circular in configuration and forms the dwell portion of the cam. The cycloidal portion of the cam between points 102 and 142 is divided into two sections separated at point 160 where $\theta = 220°$ with the angular distance of the two portions being separately defined by angles $\beta_1$ and $\beta_3$. It will be noticed that $\beta_1$ is equal to 52° and $\beta_3$ is equal to 53°. The angles $\beta_1$ and $\beta_3$ are unequal since the two portions of the perimeter of the cam defined thereby are slightly different in that they are formed from different constants which are employed in the expression defining a trigonometric path. The use of two different trigonometric portions in this specification is employed merely to illustrate that the path can be comprised of two or more portions, each trigonometrically well-defined in nature but varying in the constants employed therein to create more complex total cam surfaces.

The polar coordinate representation of the cam of FIG. 1 is shown in chart form in FIG. 2 with the Y coordinate representing the radii measured from the origin 99 (FIG. 1) of the cam and the X axis representing the angular displacement (which is equivalent to time) of the radius from the 0° line 150 in FIG. 1. Thus, in FIG. 2, at the left hand end thereof, $\theta$ is designated as being equal to 0° and the radius as being equal to 2.5 inches. When $\theta$ becomes equal to 167°, after the angular increment $\beta 2b$ has occurred, the cycloidal section defined by angle $\beta_3$ of FIG. 1 begins and follows the trigonometric path 165 until $\theta$ becomes equal to 220° at which time a somewhat different trigonometric path 166 ($\beta_1$) is generated until $\theta$ becomes equal to 272°.

The value of the minimum radius $R_1$ of the cam of FIG. 1, when $\theta$ equals 220°, is 1.4 inches, as indicated in FIG. 2, and, thereafter, increased to its original value $R_1 = 2.5$ inches during the dwell portion of the cam.

The representation of the cam shown in FIG. 2 is helpful to the machinist fabricating the cam and also is useful in displaying the shape of the desired cam for visual determination of the accuracy of the points defining the starting and terminating points of each of the straight line segments.

Worded in another way, after the computation of the starting and terminating points of each of the straight line segments have been determined and stored in a suitable memory in the same data processor which calculated such starting and terminating points, the said memory is accessed and the perimeter defined by such segments is displayed on the screen of a suitable display device, as will be described in more detail later. Inaccurate calculations will usually be apparent from a discontinuity in the curve. An accurate set of calculations will have no discontinuities and the total length of the curve should be equal to 360°.

Figure 5:
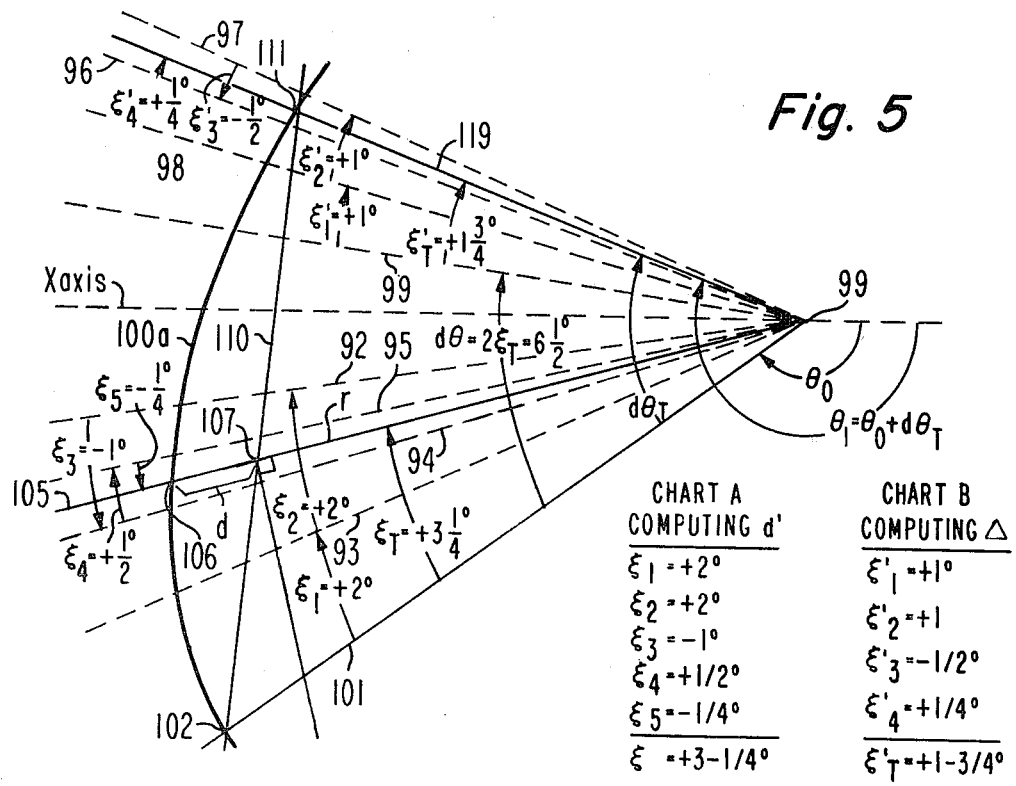
FIG. 5 is a more detailed showing of the steps required (as explained in the text) to determine the starting and terminating points of a straight line cutting segment.

A more detailed discussion of the computational technique employed herein will now be set forth with the aid of FIGS. 3 and 5. FIG. 3 is an enlarged view of a portion of FIG. 1 and shows only the final results of the calculations to determine the angles $\epsilon_T$, $\theta_0$, $\theta_1$, $\theta_2$ and $d\theta$, the radii 101, 105, 115, and 119, the values $d'$ and $\Delta$, and the intersection points 102 and 111 of the straight line segment 110. FIG. 3 does not show the intermediate steps, e.g., estimates of $\epsilon$ and $d\theta$ which are required to arrive at such final results. Such intermediate steps are shown in FIG. 5 and will be described later herein.

As discussed above briefly, cams normally consist of two types of sections, e.g., circular sections or "dwells" and sections in which the radius changes according to a trigonometric expression. For this example, a cycloidal expression is used, which is as follows:

$$R = R_0 + H(\theta/\beta - \text{SIN}(2\pi\theta/\beta))/2\pi \quad \text{(Exp. 1)}$$

where:
R is the resulting radius;
$R_0$ is the radius of the beginning of the section;
H is the change of radius over the section; and
$\beta$ is the total angle of the section.

Expression 1 defines the cycloidal portion of FIG. 3. To find the points X, Y defining the end of a given radius R, the following relationships are employed;

$$X = R \cos(\theta + \theta_0) \quad \text{(Exp. 2)}$$

$$Y = R\, S\, \text{SIN}(\theta + \theta_0) \quad \text{(Exp. 3)}$$

where $\theta_0$ is the angle of the beginning of the section and S is the rotational sense of the cam, i.e., +1 or −1. Thus, by means of Expressions 1, 2 and 3 the points of the intersection of the radial lines 101, 105 and 119 of FIG. 1 with the cycloidal curve 100 can be determined.

As discussed above, straight line segments are needed to cut a cycloidal profile with a numerical milling machine. Ideally, it is desirable to employ the least number of straight line segments to approximate the true profile while still maintaining the desired precision as determined by the distance d in FIGS. 1 and 2.

As mentioned above, four general expressions are required to determine the straight line segments required to cut a general trigonometric profile with a numerical milling machine wherein each straight line segment is a predetermined distance d from the trigonometric surface. These four general expressions are set forth below.

$$R_0 \theta - K/\cos(\alpha + \theta) = 0 \quad \text{(Exp. 4)}$$

$$R_0(\theta + d\theta) - K/\cos(\alpha + \theta + d\theta) = 0 \quad \text{(Exp. 5)}$$

$$|R_0(\bar{\theta}) - K/\cos(\alpha + \bar{\theta})| = d \quad \text{(Exp. 6)}$$

$$R'(\bar{\theta}) - \tan(\alpha + \bar{\theta}) = 0 \quad \text{(Exp. 7)}$$

Further discussion of Expressions 3–6 will be set forth later herein. A person skilled in the art will be able to adapt the four Expressions 3–6 to other trigonometric surfaces based on the detailed description of a specific cam surface of a cycloidal nature which is set forth below, and in which the Expressions 8–11 correspond to the Expressions 1–4 in the sense that 1–4 are expressions for the general trigonometric function and Expressions 8–11 are for the specific cycloidal curve. The definitions of the various terms of the four Expressions 1–4 are set forth in the specification following Expressions 1, 2, 3 and 8–11.

Turning again to the discussion of the manufacture of a cam having cycloidal path formed by successive straight line segments, the necessary starting and terminating points of each straight line segment can be calculated by means of the following four equations 8–11.

$$R_0 + H(\theta + d\theta)/\beta - \tfrac{1}{2}\pi \text{SIN}(2\pi\theta/\beta) - K/\cos(\alpha + \theta) = 0 \quad \text{(Exp. 8)}$$

$$R_0 + H(\theta + d\theta)/\beta - \tfrac{1}{2}\pi \text{SIN}(2\pi(\theta + d\theta)/\beta) - K/\cos(\alpha + \theta + d\theta) = 0 \quad \text{(Exp. 9)}$$

$$|R_0 + H\{(\bar{\theta}/\beta - \tfrac{1}{2}\pi \text{SIN}(2\pi\bar{\theta}/\beta)\} - K/\cos(\alpha + \bar{\theta})| = d \quad \text{(Exp. 10)}$$

$$\frac{H/\beta \ (1 - \cos(2\pi\bar{\theta}/\beta))}{R_0 + H\{\bar{\theta}/\beta - \frac{1}{2}\pi \ \text{SIN}(2\pi\bar{\theta}/\beta)\}} - \text{TAN}(\alpha + \bar{\theta}) = 0 \quad \text{(Exp. 11)}$$

$$\alpha = \text{ARCTAN}\left[\frac{H/\beta \ (1 - \cos(2\pi\bar{\theta}/\beta))}{R_0 + H\{\bar{\theta}/\beta - \frac{1}{2}\pi \ \text{SIN}(2\pi\bar{\theta}/\beta)\}}\right] - \bar{\theta} \quad \text{(Exp. 12)}$$

$$K = \{R_0 + H(\bar{\theta}/\beta - \frac{1}{2}\pi \ \text{SIN}(2\pi\bar{\theta}/\beta))\} \cos(\alpha + \bar{\theta}) \quad \text{(Exp. 13)}$$

where $d\theta$ is the angle between the two radii whose end points from the ends of the chord (the straight line cutting segment) having a deviation $d$ with respect to the cycloid. The angle $d\theta$ is shown in FIG. 3 as being the angle between the two radii 101 and 119 whose points of intersection with the cycloidal curve 100 form the ends of the chord 110 having a maximum distance $d$ from the cycloidal curve 100 as measured along a third radius 105.

Exressions 8 and 9 state that the chord (straight line segment) 110 of FIG. 3 intersects the cycloid 100 at each end thereof at points 102 and 111.

Simultaneous solution of Expressions 11, 12, and 13, determines the mean value, i.e., the angle $\bar{\theta}$ at which the deviation $d$ between the linear approximation (the straight line segment 110) of FIG. 3 and the true cycloidal curve 100 is the greatest. Expression 10 imposes a tolerance on the deviation $d$ at said mean value.

Expressions 8, 10 and 11 are solved iteratively by systematically varying $\theta$ and evaluating $\alpha$, $k$, and $d'$ until $d'$ falls within the desired tolerances. In fact, as will be seen later in FIG. 5, $\bar{\theta}$ is varied by assuming different values for $\epsilon_i$ which defines the angle between the two radii 101 and 105. After the final angle $\epsilon_T$ has been determined, and therefore, $\bar{\theta}$, for the desired value of $d$ in FIG. 3 and in Expression 10, Expression 9 is then solved iteratively for determining the value $d\theta$ which is the total angular increment of the straight line segment interpolation and also defines the beginning point 111 of the new straight line segment next to be determined.

In FIG. 3, the determination of $d\theta$ will define the radius 119 which intersects the cycloidal curve 100 at point 111 and thereby defines the terminating point for the chord segment 110 and the starting point of the next subsequent chord segment 135.

The foregoing procedure is then repeated to determine the next chord (straight line segment) 135 so that its maximum distance from the cycloidal curve 100 is $d'$.

The following expression, Expression 12 above, can be employed to find the angle $\alpha$:

$$\alpha = \text{ARCTAN}\frac{H/\beta \ (1 - \cos(2\pi\bar{\theta}/\beta))}{R_0 + H\{\bar{\theta}/\beta - \frac{1}{2}\pi \ \text{SIN}(2\pi\bar{\theta}/\beta)\}} - \bar{\theta}$$

Having found $\alpha$ the value of $K$ can be then found from Expression 13 above and is equal to the following expression:

$$K = \{R_0 + H(\bar{\theta}/\beta - \frac{1}{2}\pi \ \text{SIN}(2\pi\bar{\theta}/\beta))\} \cos(\alpha + \bar{\theta}) \quad \text{(Exp. 9)}$$

In order to compute the value of angle $\alpha$, it is required that $\bar{\theta}$ first be determined. It should be noted that $\bar{\theta}$ in FIG. 3 is the angle which defines the radius 105 along which the distance $d$ is measured. A line 125, which is tangent to the intersection of the radius 105 and the cycloidal curve 100, determines the slope of the chord 110, which must be parallel to the slope of tangent 125 and thereby, defines the greatest distance $d$ between chord 110 and tangent 125 for any radius extending from origin 99 between points 102 and 111. Thus, it is necessary to find the proper value of $\theta$ to compute the angle $\alpha$. To find $\bar{\theta}$, a trial and error method is employed as will be shown in FIG. 5 in that iterative improvements in an initial guess of the value of $\bar{\theta}$ are made.

The initial guess of $\bar{\theta}$, which is equal to $\theta_0$ plus an increment $\epsilon_1$ as shown in FIG. 5 and defined by radius 93, is then employed in Expression 10 to determine a first value of $d'$. Such value $d'$ is then compared, by means to be discussed later, with a predetermined constant $d$ which is the desired maximum distance between chord 110 and curve 100. If $d' = d + \Delta d$ then $d'$ is acceptable and the intersection 111 of chord 110 and curve 100 will be computed next. In most cases, however, $d'$ will lie outside $d + \Delta d$ so that a new value of $\bar{\theta}$ will be assumed and $d'$ calculated again. For purposes of discussion assume $d' < d - \Delta d$. It can be seen that value of $d'$ must necessarily increase with increases in $\bar{\theta}$ and decrease with decreases in $\bar{\theta}$ so that a bisection form of iteration is acceptable to determine $d'$. A bisection iteration is generally one in which $\bar{\theta}$ is increased and decreased by successively smaller amounts until $d'$ falls within the permissible range of values. For example, $\bar{\theta}$ can be initially increased by a value $\epsilon_1$ as defined by radius 93 in FIG. 5. If $d'$ is still too small, as computed by Expression 6, then $\bar{\theta}$ is again increased by an angular amount $\epsilon_2$, which is equal to $\epsilon_1$, as shown in FIG. 5 and defined by radius 92, and the computation for $d'$ performed again. If $d'$ is then too large, then the value of $\bar{\theta}$, now equal to $\theta + 2\epsilon_1$, is decreased by a value equal to $\epsilon_3 = \epsilon_{1/2}$ so that $\epsilon_i = 2\epsilon_1 - \epsilon_1/$ 'and $\bar{\theta} = \theta + 2\epsilon_1 - \epsilon_{1/2}$ and defined by radius 94 in FIG. 5 and the computation for $d'$ repeated. The value of $\epsilon_i$ (the intermediate current value of $\epsilon$) is thus successively increased or decreased by values equal to the previous change or $\frac{1}{2}$ the previous change, depending upon the polarity of the previous change, until $d'$ falls within the permissible range $d + \Delta d$. A more detailed description of the bisection method of determining $\epsilon_T$ will be set forth below.

At this time, the iterative calculations for $\bar{\theta}$ are discontinued and iterative calculations for $d\theta$ begun, using the same general technique described above. More specifically, estimates are made of $d\theta$ using the same bisection iteration procedure discussed above until the distance between the points of intersection of radius 119, defined by $d\theta$ with chord 110 and cycloidal curve 100 is less than a predetermined value. It is evident from FIGS. 3 and 5 that when the two intersection points of radius 119 with chord 110 and curve 100 are exactly coincident with the value of $d\theta$ is mathematically precise. However, since the procedure employed herein is one of trial and error coincidence of such two points of intersection is judged to be sufficient when they are separated by less than a predetermined value. A first guess for $d\theta$ of $2\epsilon_T$ is frequently close enough that no iteration is required.

Figure 4:
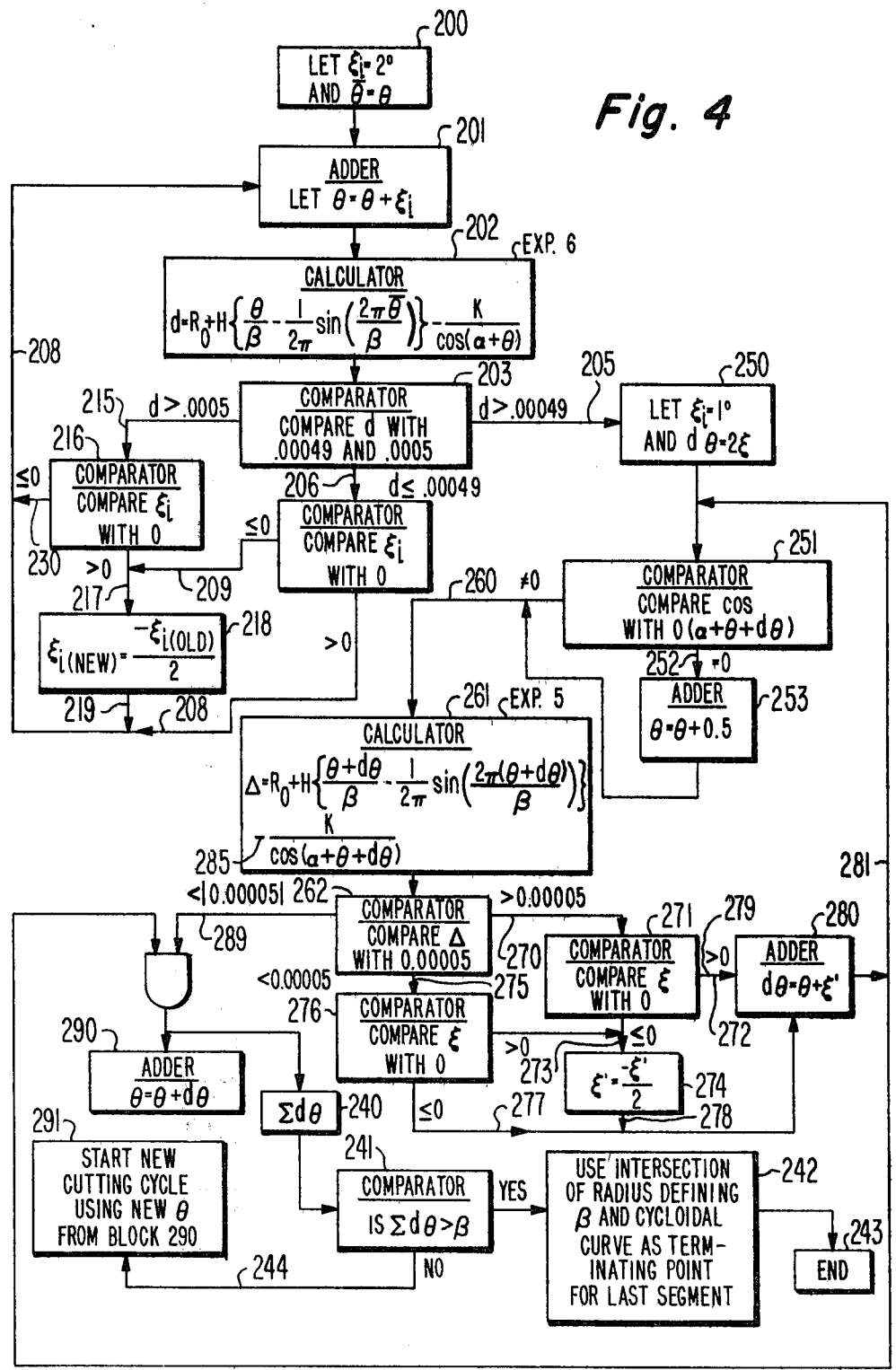
FIG. 4 is a logic diagram of the invention.

Reference is now made to the flowchart of FIG. 4, which shows the steps required to determine $\bar{\theta}$ of FIG. 3 and subsequently, $d\theta$ of FIG. 3. In FIG. 4, the initial conditions are that $\bar{\theta}$ is equal to $\theta$ and $\epsilon_1$ is made equal to 2°, as an initial angular estimate shown in block 200 and defined by radius 93 in FIG. 5, and also shown in chart A of FIG. 5.

A further initial assumption is that $\bar{\theta}$ is equal to $\theta$ plus $\epsilon_1$ as shown in block 201. It is apparent that $\bar{\theta}$ is a variable in that $\epsilon_1$, another variable, is added thereto during each of the several computations required to compute the value of d' in accordance with the expression shown within block 202. Such expression within block 202 is identical to Expression 10 set forth hereinbefore with each of the values of Expression 10 being defined above.

In FIG. 4, the first calculation of d' is made with $\theta$ being equal to $\theta + \epsilon_i$ where $\epsilon_i = \epsilon_1$ has been initially set at 2°. The calculated value of d' is then compared with the range of values permitted which, in this example, will be assumed to be less than 0.0005 inches and greater than 0.0049 inches, as indicated by the notation in the comparator 203 in FIG. 4 and which is generally defined herein as d. Since $\epsilon_1$ has been chosen so d' is less than or equal to 0.0049 inches then the logic flow is to the TEST $\epsilon_1$; comparator step 207. It is apparent that in this first calculation of d', $\epsilon_1$ is an insufficient angular addition to $\theta$ since d' is less than 0.00049 inches. It can be seen from FIG. 3 that as $\epsilon$ becomes smaller, the value of d' measured along radius 105 becomes less. The TEST $\epsilon_1$ comparator 207 examines $\epsilon_i$ and determines that it is positive (greater than 0) and by means of logic flow path 208 again adds the current value of $\epsilon_i = \epsilon_1 = 2° = \epsilon_2$ to $\bar{\theta}$ as indicated in adder 201. Thus, $\epsilon_T = \epsilon_1 + \epsilon_2 = 4°$, and the $\bar{\theta}_{new} = \bar{\theta}_{old} + \epsilon_1 + \epsilon_2$ as defined by radius 92 of FIG. 5. Computation of d' is performed again with the value of $\bar{\theta}_{new}$.

Assume that the second calculation of d' is greater than 0.0005 inches. Thus, the test d' comparator 203 will activate the test $\epsilon$ comparator 216 via path 215 for $\epsilon_2$ wherein $\epsilon_2$ is the previous angular increment. The test $\epsilon$ block 216 will determine whether $\epsilon_2$ at that time is positive or negative, that is, less than 0 or greater than 0. As discussed above and shown in chart A, $\epsilon_i = \epsilon_2$ and is a positive 2° so that comparator 218 is activated via path 217 to change the value $\epsilon_2$ to a value $= \epsilon_2/2$. Since $\epsilon_2$ entered block 218 as a positive 2° it will exit block 218 as $\epsilon_3 = -1°$ via paths 219 and 208 and be supplied again to adder 201. The new cumulative value $\epsilon_T = \epsilon_1 + \epsilon_2 + \epsilon_3 = +3°$ so that the new cumulative value of $\bar{\theta}_{new}$ is $\theta + 3°$, as defined by radius 94 of FIG. 5.

The value d' is computed again with the new value of $\bar{\theta}_{new}$ in block 202 and then tested in block 304. It is evident since the new cumulative value of $\bar{\theta}_{new}$ has been decreased by 1° that the value of d' will become less. Assume that d' is now less than 0.00049 so that comparator 207 is activated. Since the current value of $\epsilon_i = \epsilon_3 = -1°$ and is therefore less than 0, the logic block 218 will again be activated to change the current value of $\epsilon_3$ from a $-1°$ to a $+\frac{1}{2}$ ($\epsilon_4 = -\epsilon_3/2$), which value of $\epsilon_4$ is supplied via path 208 back to adder 201. The value $\bar{\theta}_{new}$ then becomes equal to the original $\theta + \epsilon_T$ where $\epsilon_T = \epsilon_1 + \epsilon_2 + \epsilon_3 + \epsilon_4 = 3.5°$, as defined by radius 95 of FIG. 5.

The value of d' is again calculated with the new value of $\theta$ and then tested in comparator 203. Assume that the new calculation of d' is again greater than 0.0005 inches so that the test of $\epsilon_4$ in block 216 is activated via path 215. Since $\epsilon_T$ is now greater than zero the value of $\epsilon_i$ is again changed in accordance with the expression within block 218. More specifically, the current value of $\epsilon_i$, which is a positive $\frac{1}{2}°$, is now changed to a $-\frac{1}{4}°$ which is supplied to adder 201 via path 208 thus reducing the accumulated value of $\theta$ by $\frac{1}{4}°$. It can be seen that the reduction of $\theta$ is a natural consequence of the fact the d' was greater than 0.0005 and a reduction of $\theta$ will function to lessen d'. $\epsilon_T$ is now equal to $3\frac{1}{4}°$, as defined by the radius 105 and as shown in chart A of FIG. 5.

This new calculated value of d' is then again tested in block 203. Assume that this calculation of d' is now greater than 0.00049 and less than 0.0005 inches. In such an event, the value of d' is now within the predetermined limits and establishes the cumulative value of $\bar{\theta}$ at a value equal to the original angle $\theta + 3\frac{1}{4}°$ which is the accumulated value of $\epsilon_T$ and which is defined by the radius 105 on which the final value of d' lies.

The permissible range of values of d' can be defined as $d' \pm \Delta d'$ where $$\Delta d' = \pm (0.00050 - 0.00049)/2 = \pm 0.000005$$

inches.

Inherent in the calculations set forth above, is the slope of the line 110 of FIGS. 3 and 5, which is the cutting segment which has been determined. It is now necessary to determine where the straight line segment 110, when extended, intersects the cycloidal curve 100. Such intersection is defined by reference character 111 in FIG. 5. Such intersection can be found by trigonometric means. However, it is simpler to find point 111 by assuming different values for $d\theta$ and then determining the intersections of the resulting radius, such as radius 119, with the line 110 and the curve 100 until the difference between such two points of intersection becomes less than some predetermined value which, in the example to be discussed, is 0.00005 inches as shown in FIG. 4.

The value of $d\theta$ is first estimated to be equal to $2\epsilon_2$ as shown in block 250 of FIG. 4 and where $\epsilon'_i$ is the new variable angular increment which will be assumed herein to be 1°. In most cases, such an original estimated value of $d\theta$ will be very close to the desired point 111 in FIG. 3. If such initial estimate of $d\theta$ is not sufficiently close, then $d\theta$ will be changed by various decreasing values of $\epsilon'_i$ in a manner similar to that described above re computing the value d'.

It will be observed that in the calculation shown in block 261, which is Expression 5 above, the denominator of one of the terms is cosine $(\alpha + \theta + d\theta)$. If such expression is equal to zero, an error will result in the calculation of logic 261. By incrementing the value $\theta$ by 0.5° in logic 253 and then initiating computation in logic 261 the error will be avoided.

If the expression cos $(\alpha + \theta + d\theta)$ is not equal to zero, then the calculation shown in block 251 is made directly. As in the calculation within block 202 of FIG. 4, the main term to the left of the negative sign (−) 285 represents the distance between the origin 99 of FIG. 3 and the intersection of radius 119 with the cycloidal curve 100. The term to the right of the minus sign 285 in block 261 represents the distance between the origin 99 of FIG. 3 and the intersection of the radius 119 with the extended straight line segment 110.

When the difference between these two distances becomes zero, the point 111 is precisely determined. However, for practical purposes, since the determination of point 111 is a result of iterative computations as will be discussed below, the location of point 111 and the angle $d\theta$ are presumed to be sufficiently well-determined when such difference is below a minimum value defined as 0.00005 inches.

The result ($\Delta$) of the computation of Expression 5 within block 261 is tested in comparator 262 of FIG. 4. If $\Delta$ is less than the absolute value of 0.00005, then the computation is ended and $\theta$ is updated to be equal to $\theta_{new}$=the original $\theta+d\theta$. The value $\theta_{new}$ is the starting $\theta_1$ for the next computation.

On the other hand, $\Delta$ can either be greater than a +0.00005 inches or greater than a −0.00005 inches. In either case, the value of $d\theta$ must be modified. More specifically, if the comparator 262 shows that $\Delta$ is greater than 0.00005 then the test $\epsilon'$ block 271 tests the polarity of $\epsilon_i'$. If $\epsilon_i'$ is positive, i.e., greater than zero, as it is initially, then the output of test $\epsilon$ block 271 is supplied via path 272 to adder 280, wherein $d\theta$ is incremented by $\epsilon_i'$ which is the first computation of $\epsilon_i'$, as shown in chart B of FIG. 5.

It can be seen from FIG. 5 that the initial value of $d\theta$, which was made equal to $2\epsilon_T$, is defined by the radius 99 which will result in a positive value of $\Delta$ greater than 0.00005. Thus, the new value of $d\theta$ will be the old value of $d\theta$ plus $\epsilon_i'$, which is assumed to be 1°.

After again checking for a zero value of cos $(\alpha+\theta+d\theta)$ in block 251, as discussed above, the calculation as shown in block 261 is repeated to find the new value of $\Delta$.

Such new value of $\Delta$ is checked in test block 262 to determine if its absolute value is less than 0.00005 inches. If it is, the calculations are terminated and $\theta$ incremented as shown in block 290 to establish the starting $\theta$ for the next straight line segment to be calculated.

In the example being discussed, however, $\Delta$ is assumed to be still greater than +0.00005 inches, as evidenced by the intersection of radius 98 (FIG. 5) with curve 100 and chord 110. Consequently, another increment of 1°, identified as $\epsilon_2'$ in chart B of FIG. 5 will be added to $d\theta$ by the logic 271 and 280 of FIG. 4. The computation of $\Delta$ with the new updated value of $d\theta$ occurs in block 261 and the resulting value of $\Delta$ tested in the test $\Delta$ block 262.

The newly updated $d\theta$ is defined by radius 97 in FIG. 5. The intersection of radius 97 with curve 100 and chord 110 results in a negative value for $\Delta$, which will be assumed to be greater than −0.00005 inches. Accordingly, the comparator $\epsilon_i'$ block 276 will be energized to determine whether $\epsilon_i'$ is greater or less than zero. As stated above, the last value of $\epsilon=\epsilon_2'$ was a +1°. Therefore, the logic block 274 is activated and $\epsilon_i'$ now becomes $\epsilon_3'=n-\frac{1}{2}°$, which is supplied to the logic block 280 via paths 278 and 281 in FIG. 4. Thus, the value of $d\theta$ is diminished by $\epsilon_3'=-\frac{1}{2}°$, and now defined by the radius 96 in FIG. 5. The intersection of the radius 96 with curve 100 and the straight line segment 110 is then calculated in block 261 and tested in the test $\Delta$ block 262. For purposes of this discussion, it will be assumed that the value of $\Delta$ is greater than +0.00005 inches so that a test $\epsilon$ block 271 will be activated. Since the last value of $\epsilon_3'$ is $-\frac{1}{2}°$, as shown in chart B of FIG. 5, the block 273 is energized and $\epsilon_i'$ now becomes a $+\frac{1}{4}°$. The value $+\frac{1}{4}°$ is entered into the block 280 to increase $d\theta$ by $\frac{1}{4}$. The calculation of based on the newly updated value of $d\theta$ is then made in a block 261 and supplied to test $\Delta$ block 262.

It will further be assumed, for purposes of this discussion, that the absolute value of the new $\Delta$ is less than 0.00005 so that function block 290 is activated with the overall $\theta$ value being increased to define the starting angle $\theta_1$ for the next segment to be calculated.

It is evident, as discussed briefly above in connection with FIG. 1, that the last straight line cutting segment to be calculated, and which is shown as straight line cutting segment 140 in FIG. 1 cannot be calculated by the algorithm set forth in FIG. 4 since the terminating point 142 thereof, is determined by the end of the cycloidal section 100 and is not determined by the value $d'$. Accordingly, means 240 are provided to accumulate the value of $d\theta$ for each of the cutting segments up to the determination of the last cutting segment 140.

Each new accumulation of $d\theta$ is compared in comparator 241 with the total angular section $\beta$ of the cycloidal section 100 being examined and when the last $d\theta$ value causes the accumulated $d\theta$'s to exceed the angular length of the cycloidal section 100 the logic 242 will cause the terminating point of said cycloidal section to be employed as the terminating point of the last straight line cutting segment 140.

If the comparator 241 shows that the total accumulation of $d\theta$'s does not exceed $\beta$ then the system begins a new cycle to determine the beginning and termination points of the next cutting segment by means of instruction logic 291 in response to "No" indication on output lead 244 of comparator 241.

After the cutting of the last segment, the operation will end as indicated by block 243. Specific logic means for performing the calculation of the last cutting line segment is not shown in FIG. 4 due to the amount of complexity it would unnecessarily add to the specification.

In summary, calculation of the beginning and terminating points of each straight line section cutting section can be accomplished by means of the logic represented by the diagram of FIG. 4. Such calculations can also be performed by means of an appropriate program executed in a suitable data processor. It is to be understood that algorithms other than the one shown in FIG. 4 can be created to determine the straight line cutting segments having the characteristics set forth hereinabove. The important characteristic is that the starting and terminating points of each straight line segment are determined so that the maximum distance measured radially from the common origin between said each straight line segment and the cycloidal curve be of the same predetermined magnitude dependent upon the error tolerances of the milling machine equipment and the error permissible in the cam being milled.

In a system employing a computer, a program for calculating the beginning and terminating points for each straight line cutting segment will be hereinafter sometimes referred to as the computing program, as compared to the control program, which will be discussed later herein, and which physically exercises control of the movement of the cutting tool along the perimeter of the cam being milled.

Figure 6:
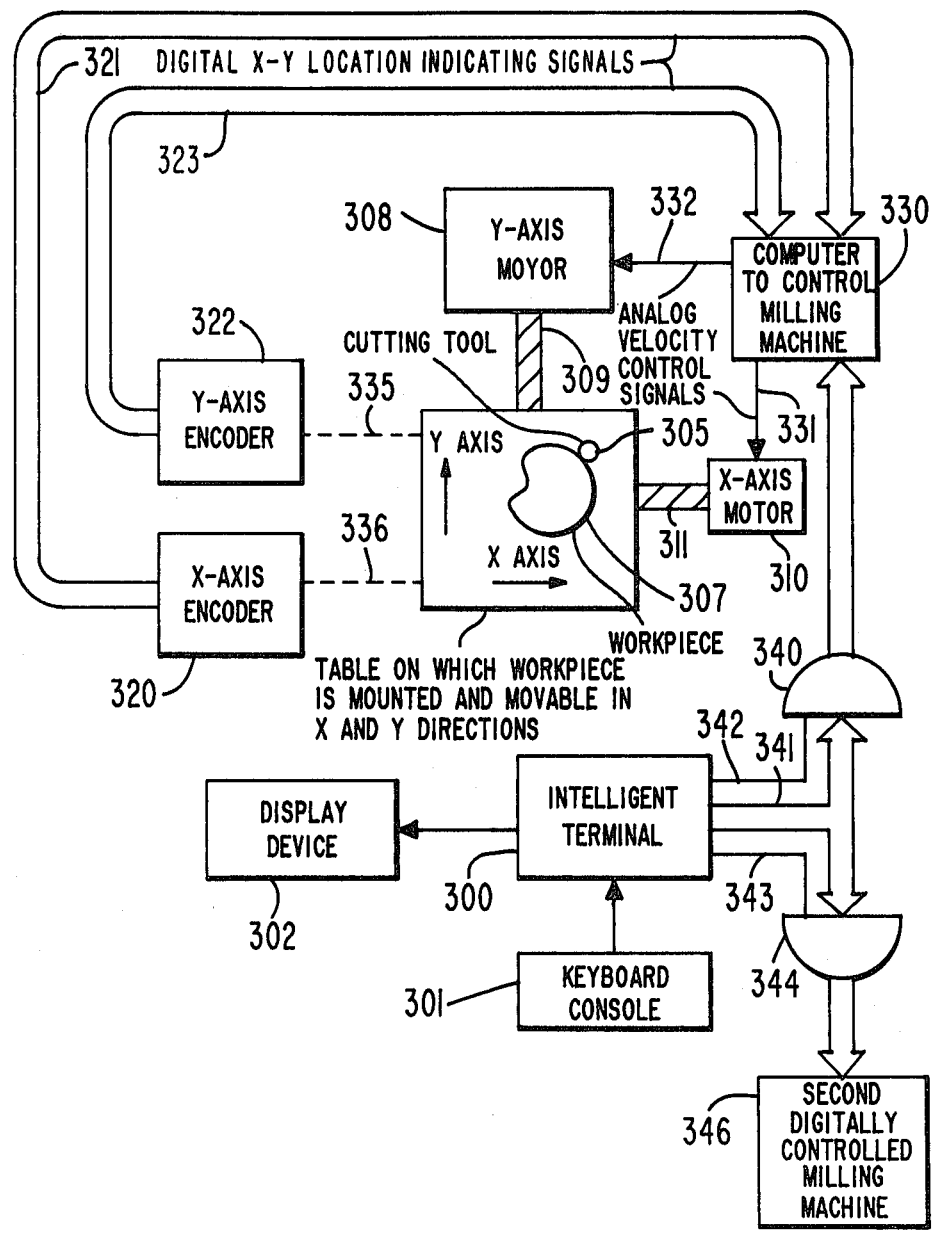
FIG. 6 is a block diagram of an overall system incorporating the invention.

The computing program is resident in the intelligent terminal 300 of the system of FIG. 6. Certain parameters are entered into terminal 300 by means of a keyboard console 301. Some of such parameters are shown in FIG. 2 and include the starting radius at $\theta=0°$. Such starting radius, in the particular example shown, is equal to 2.5 inches. Such radius is constant until $\theta$ is equal to 167°, which angular value is also entered into terminal 300. The minimum radius of 1.4 inches occurs at $\theta=220°$, also entered into terminal 300 as a constant. The return to the maximum radius 2.5 inches at the angular value $\theta=272°$ is also entered into terminal 300. The values $\beta_{2B}$, $\beta_3$, $\beta_1$, $\beta_{2A}$ represent various component values of $\theta$ as discussed above.

The above-mentioned values of $\theta$ and various radii satisfy the requirements of Expression 1, which defines a cycloidal path. All the points in the curves of FIGS. 1 and 2 will thus be determinable by the constants supplied to the intelligent terminal 300. The resident computing program within the intelligent terminal 300 will then function to perform the calculations shown in FIG. 4 in that it will compute and store the beginning and terminating points of each straight line cutting segment.

Once the necessary constants are stored in the terminal 300, such terminal 300 can be caused, by well known means, to display the programmed cutting path on a suitable display device 302 under control of appropriate control signals generated by an operator at keyboard terminal 301. For example, the display device 302 can display the radii versus angular displacement curve (FIG. 2) of the cam surface. FIG. 2 is, in effect, a timing diagram since the angular displacement of $\phi$ is linear with time. Such timing chart of FIG. 2 can be shown before the calculations are made of the beginning and starting terminating points of each of the straight line cutting edges. If the timing chart of FIG. 2 appears to be accurate to the operator, the operator can then instruct the intelligent terminal 300 to calculate the beginning and terminating point coordinates for each of the straight line cutting segments. Upon completion of such calculations, the operator, by means of the intelligent terminal 300, can then cause the display device 302 to display the calculated cutting edge, which is the curve 100 of FIG. 1.

It should be noted that before calculations are made, the probable accuracy of the diagram of FIG. 2 can be seen visually, in that the starting and terminating radii at the extreme left and right hand ends of the diagram are equal, and further, that there are no discontinuities in the diagram. For example, if the cycloidal sections 165 and 166 did not meet where $\theta=220°$ then it would be evident that an error had been made requiring the operator to recheck his entered constants and the equipment.

If, however, the timing diagram of FIG. 2 appears to be accurate, as discussed above, the beginning and terminating coordinates for each straight line segment can be calculated in accordance with FIG. 4 by the computer program in the intelligent terminal 300 and the results displayed on display device 302 in the form of curve 100 of FIG. 1.

The operator can then examine the displayed curve 100 to determine if it is the same as that of the desired cam and, if so, the cutting of the cam can proceed. If the curve 100 of FIG. 1 has a discontinuity therein or has a perimeter dissimilar from the desired shape, then an error will have occurred and the operator will again check his entered constants and his equipment.

The intelligent terminal 300 will also function to generate initialization instructions for the milling cutting tool and more specifically the starting point and position of the cutting tool with respect to the workpiece to be milled.

In FIG. 6, the cutting tool 305, which normally is a rotating cutting tool, is shown coming out of the drawing in a vertical position adjacent the workpiece 307, which is the raw stock of the cam to be milled. The workpiece 307 is mounted on the surface of a table 306 which can be moved along the Y axis by means of a Y axis control motor 308, which drives a shaft 309 to move the table 306 along said Y axis. A second motor 310 functions to respond to control signals from computer 330 to move the table 306 along the X axis by means of a control shaft 311. As indicated above, both the X axis motor 310 and the Y axis motor 308, are controlled by analog velocity control signals which are supplied thereto from computer 330 via control leads 332 and 331.

As an example of the cooperation of the X and Y axis motors 308 and 310, the table 306 can be caused to move at a 45° direction with respect to the X axis if both motors 308 and 310 are rotated at the same velocity and, of course, in the proper direction. By causing the X axis motor to rotate at twice the velocity of the Y axis motor, the table 306 is caused to move at an angle of 26.6° rather than 45°, assuming again the proper rotational directions of the Y and X axis motors 308 and 310. It is also to be noted that the Y and X axis motors 308 and 310 are energized by analog signals so that the table 306 will move in fact, in a straight line between two points determined by the velocities of rotation of the Y and X axis motors 308 and 310 and the directions of rotation thereof.

The Y axis encoder 332 and the X axis encoder 320 are devices well known in the art and respond to the X and Y coordinate positions of the table 306 to generate digital signals indicating such Y and X coordinate positions. Such signals are supplied via multi-lead connections 323 and 321 to computer 330 which records such digitized X and Y coordinate positions of the table 306.

Returning again to the function of the intelligent terminal 300, the starting and terminating X-Y coordinates of each straight line cutting segment generated therein are supplied through AND gate 340, when enabled by an enabling signal via control lead 342, to the second computer 330 which functions to control the milling machine and more specifically, the movement of the table 306 with respect to the fixed position cutting tool 305.

Once the needed data is stored in computer 330, the AND gate 340 can be disabled and AND gate 344 enabled by an appropriate control signal on control line 343. Data defining a different cam can then be supplied through enabled AND gate 344 to a second digital milling machine 346 to mill the second cam.

Alternatively, if it is desired to manufacture two cams precisely the same, then the same data can be simultaneously supplied to computers 330 and 346 through AND gates 340 and 344 which are concurrently enable by enabling pulses on control leads 342 and 343.

What is claimed is:

1. In a system having prime moving means for controlling the relative position of a working surface and a cutting edge so that said cutting edge approximates a path with respect to said working surface definable by a mathematical expression, a method of moving said cutting edge relative to said working surface in a series of successive straight line segments each of which lies between a pair of first and second points on said definable path with the second point of each pair being the first point of the next pair and comprising the steps of:

determining the coordinates for said first and second points for each successive straight line segment with each successive straight line segment having the same maximum distance $d \pm \Delta d$ from said definable path measured along a line extending from a common reference and between said pair of first and second points, and intersecting said definable path at a given point with the tangent to said definable path at said given point defining a line to which the said each successive line segment is parallel, and where $\Delta d$ is a predetermined tolerance;

generating prime moving means control signals in response to and in accordance with said determined coordinates;

energizing said prime moving means in accordance with said control signals to move said cutting edge with respect to said working surface successively along the said straight line segments.

2. In a system having first and second prime movers for controlling the relative positions of a working surface and a cutting edge so that said cutting edge approximates a rotational path about an origin between the angles $\theta_o$ and $\theta_1$ measured from said origin and definable by a mathematical expression, a method of moving said cutting edge relative to said working surface in a series of successive straight line segments each of which lies between a pair of successive first and second points on said definable path with the second point of each pair being the first point of the next pair and with the first and second points of each pair lying on radii extending from said origin and defining an angle $d\theta$ and each having a maximum deviation $d \pm \Delta d$ from said definable path along a radial path extending from said origin, said method comprising the steps of:

determining the coordinates for said first and second points for each successive straight line segment with each successive line segment having a maximum distance $d \pm \Delta d$ from said definable path along a radial line extending from said origin and between said first pair of first and second points and intersecting said definable path at a given point with the tangent to said definable path at said given point defining a line to which the said each successive line segment is parallel;

storing the coordinates defining the first and second points of each straight line segment; and energizing said first and second prime movers in accordance with said stored coordinates to move said cutting edge with respect to said working surface successively along the said straight line segments.

3. In a system having first and second prime movers controlling the relative positions of a working surface and a cutting edge so that said cutting edge approximates a rotational path about an origin between radii extending from said origin and defining angles $\theta_0$ and $\theta_1$, respectively, with respect to a reference radius and with said path being definable by a mathematical expression, a method of moving said cutting edge relative to said work surface in a series of successive straight line segments each of which is defined by first and second points lying on said definable path with the second point of each pair being the first point of the next pair and comprising the steps of:

computing the slope of each successive straight line segment by determining a maximum distance $d'$ between the points of intersection of a radial line extending from said origin at a first estimated angle $\theta_n + \epsilon_i$ with said definable path and with said each successive straight line segment which passes through the first point thereof and which is parallel to a tangent to the definable path at the intersection thereof with said radial line; where $\theta_n$ is the angle defined by a radius extending from said origin through said first point of each nth successive straight line segment;

increasing $\epsilon$ if $d' < (d - \Delta d)$ and decreasing $\epsilon$ if $d' > (d + \Delta d)$ for each computer successive straight line segment unti $(d - \Delta d) < d' < (d + \Delta d)$;

determining second points of intersection between said definable path and each successive straight line segment; and energizing said first and second prime movers to move said cutting edge with respect to said working surface successively along said straight line segments.

4. In a system having first and second prime movers for controlling the relative positions of a working surface and a cutting edge so that said cutting edge approximates, with respect to said working surface, a rotational path about an origin between the angles $\theta_0$ and $\theta_1$ measured from said origin and definable by a mathematical expression, a method of producing relative movement between said cutting edge and said working surface to in effect move said cutting edge in a series of successive straight line segments with respect to said working surface and with each straight line segment lying between a pair of successive first and second identifiable coordinate points on said definable path with the second point of each pair being the first point of the next pair and with the first and second points of each pair lying on radii extending from said origin and defining an angle $d\theta$ and each having a maximum deviation $d \pm \Delta d$ from said definable path along a radial path extending from said origin, said method comprising the steps of:

(a) assuming an initial value $\epsilon_1$ for a variable angular distance $\epsilon$ measured from the fixed starting angle $\theta_0$, with $\bar{\theta} = \theta_0 + \epsilon_1$;

(b) determining the tangent to said definable path where the radius defined by the angle $\bar{\theta} = \theta_0 + \epsilon_1$ intersects said definable path;

(c) determining the distance $d'$ between said tangent and the particular straight line segment parallel thereto which passes through said first point, where $d'$ is measured along the radius defined by said angle $\theta_0 + \epsilon_1$;

(d) increasing $\epsilon_1$ if $d' \leq d \pm \Delta d$;

(e) decreasing $\epsilon_1$ if $d' > d \pm \Delta d$;

(f) repeating steps (b) through (e) until $(d - \Delta d) < d' < (d + \Delta d)$;

(g) determining the coordinates of said second point which is defined by the intersection of said particular straight line segment with said definable path and with $(d - \Delta d) < d' < (d + \Delta d)$;

(h) determining the angle $\theta_0° + d\theta$ defined by the radius intersecting said second point;

(i) changing $\theta_0$ to $\theta_0 + d\theta$;

(j) repeating steps (a) through (i) N times until $\theta_0 + Nd\theta$ equals or exceeds $\theta_1$;

(k) storing the coordinates defining the first and second points of each straight line segment;

(l) energizing said first and second prime movers in accordance with said stored coordinates to in effect move said cutting edge with respect to said working surface successively along said straight line segments.

5. A system for having first and second prime movers for directing a cutting edge along a rotational path about an origin between radii extending from said origin and $\theta_0$ and $\theta_1$, respectively, with respect to a reference radius and with said path being definable by a mathematical expression, and with said cutting edge being directed in a series of straight line segments each definable by first and second points of intersection with said definable path and with the second point of each straight line segment being the first point of the next successive straight line segment and further with each straight line segment being spaced from said definable path the same maximum distance d' measured along a radius extending from said origin and lying within the first and second points of said each straight line segment, and intersecting said definable path at a given point with the tangent to said definable path at said given point defining a line to which the said each successive line segment is parallel, where $d' = d \pm \Delta d$, and comprising:

- first means for determining the distance d' between each successive straight line segment and said definable path;
- second means responsive to the determination of d' for each successive straight line segment immediately after determining the distance d' thereof to establish the first point of intersection of the next successive straight line segment whose d' value is to be then determined;
- means for determining and storing the coordinates defining the first and second points of intersection of each of said straight line segments with said definable path;
- control means responsive to said stored coordinates to generate prime mover control signals;
- said first and second prime movers responsive to said prime mover control signals to cause said cutting edge to move along said successive straight line segments with respect to said working surface;
- sensing means responsive to the relative motion of said work surface and said cutting edge to generate second signals indicating such relative motion; and
- said control means responsive to said second signals to determine when the position of said cutting edge with respect to said work surface is at the second point of each successive straight line segment.

6. A system having prime moving means for controlling the relative movement between a working surface and a cutting edge with said relative movement approximating a path definable by a mathematical expression, and occurring in a series of straight line segments each definable by first and second points of intersection with said definable path and with the second point of each straight line segment being the first point of the next successive straight line segment and further with each straight line section being spaced from said definable path the same maximum distance d' measured along a line extending from a common reference and passing between the first and second points of each straight line segment and intersecting said definable path at a given point with the tangent to said definable path at said given point defining a line to which the said each successive line segment is parallel, where $d' = d + \Delta d$, and comprising:

- first means for determining the distance d' between each successive straight line segment and the said definable path;
- second means responsive to the determination of d' for each successive straight line segment to immediately thereafter establish the location of the first point of intersection of the next successive straight line segment whose d' value is to be determined; and
- control means responsive to the determined location of said points of intersection to generate prime moving means control signals;
- said prime moving responsive to said control signals to cause said cutting edge to move along said successive straight line segments with respect to said working surface.

* * * * *

UNITED STATES PATENT AND TRADEMARK OFFICE
CERTIFICATE OF CORRECTION

PATENT NO. : 4,423,481

DATED : December 27, 1983

INVENTOR(S): Keith S. Reid-Green, et al.

It is certified that error appears in the above-identified patent and that said Letters Patent is hereby corrected as shown below:

Col. 8, line 36, "$\varepsilon_i = 2\varepsilon_1 - \varepsilon_{1/}$'" should be
  $--\varepsilon_i = 2\varepsilon_1 - \varepsilon_{1/2}--$ Col. 9, line 38, "value=$\varepsilon_{2/2}$" should be
  --value-$\varepsilon_{2/2}$ --

Col. 9, line 52, "a+1/2($\varepsilon_4 = -\varepsilon_{3/2}$)" should be
  --a+1/2°($\varepsilon_4 = -\varepsilon_{3/2}$)--

Col. 18, line 31, "prime moving responsive" should be
  --prime moving means responsive--.

Signed and Sealed this

Sixth Day of March 1984

[SEAL]

Attest:

GERALD J. MOSSINGHOFF

Attesting Officer     Commissioner of Patents and Trademarks